(12) United States Patent
Slechta

(10) Patent No.: US 9,797,794 B2
(45) Date of Patent: Oct. 24, 2017

(54) INFERENTIAL SENSING ENGINE

(71) Applicant: Invensys Systems, Inc., Foxboro, MA (US)

(72) Inventor: William M. Slechta, North Attleboro, MA (US)

(73) Assignee: Invensys Systems, Inc., Foxboro, MA (US)

( * ) Notice: Subject to any disclaimer, the term of this patent is extended or adjusted under 35 U.S.C. 154(b) by 214 days.

(21) Appl. No.: 14/303,795

(22) Filed: Jun. 13, 2014

(65) Prior Publication Data

US 2014/0368259 A1    Dec. 18, 2014

Related U.S. Application Data

(60) Provisional application No. 61/835,236, filed on Jun. 14, 2013.

(51) Int. Cl.
*G01L 9/02* (2006.01)
*F17C 13/02* (2006.01)

(52) U.S. Cl.
CPC ............... *G01L 9/02* (2013.01); *F17C 13/02* (2013.01); *F17C 13/025* (2013.01); *F17C 2250/032* (2013.01); *F17C 2250/043* (2013.01)

(58) Field of Classification Search
CPC .......... H03M 1/08; G01L 9/02; G01L 9/0041; F17C 13/02; F17C 13/025; F17C 2250/032; F17C 2250/043
See application file for complete search history.

(56) References Cited

U.S. PATENT DOCUMENTS

| | | | | |
|---|---|---|---|---|
| 3,978,325 A | * | 8/1976 | Goldstein | G01K 13/002 374/169 |
| 4,878,184 A | * | 10/1989 | Okada | G01K 7/42 374/107 |
| 5,725,308 A | * | 3/1998 | Smith | G01K 7/42 374/169 |
| 5,771,947 A | * | 6/1998 | Kountz | F17C 5/06 137/80 |

* cited by examiner

*Primary Examiner* — Jung Kim
(74) *Attorney, Agent, or Firm* — Stephen Manetta; Ralph Graham

(57) ABSTRACT

Providing a fast response to a process step while allowing a sensor response to remain relatively slow. A mechanical component generates a response to a step change in a physical property and an electrical component generates an analog electrical signal indicative of the response generated by the mechanical component over a period of time. The analog electrical signal is converted into digital values and the digital values are used to indicate the final value of the step change in the physical property before the period of time has elapsed.

20 Claims, 2 Drawing Sheets

INFERENTIAL SENSING ENGINE

CROSS-REFERENCE TO RELATED APPLICATION

This application claims the benefit of U.S. Provisional Application Ser. No. 61/835,236, filed Jun. 14, 2013, the entire contents of which are hereby incorporated by reference.

BACKGROUND

A sensing system includes a collection of mechanical and electrical components used to detect or measure a physical property and to indicate the detected or measured physical property. The mechanical components require an amount of time to respond to changes in the physical property. Additionally, one or more of the electrical components may intentionally slow the sensing time for the sensing system to reduce noise that would have otherwise been present when the sensor system is sampling under stable process conditions.

The amount of time required for the sensing system to respond to changes in the physical property may be decreased by reducing the amount of signal filtering or other electrical circuit alterations. However, these approaches introduce undesirable side effects, such as increased noise or susceptibility to vibration effects.

SUMMARY

Aspects of the present invention relate to a sensor system that provides a fast response to a change in a physical property. In particular, aspects of the invention minimize delay while the sensor system slews to a final value after the change that occurs in the physical property.

In one aspect, a sensor generates an analog electrical signal over a period of time in response to a step change in a physical property. The sensor comprises at least one mechanical component configured to generate a response to the step change in the physical property and at least one electrical component in communication with the mechanical component for generating the analog electrical signal. The analog electrical signal is indicative of the response generated by the mechanical component. An analog-to-digital (A/D) converter is connected to the electrical component for receiving and converting the analog electrical signal into a plurality of discrete digital values as a function of time. A control circuit is connected to the A/D converter for receiving the discrete digital values and the control circuit is configured to infer a final value of the step change in the physical property before the period of time has elapsed as a function of one or more of the received discrete digital values.

In another aspect, a mechanical response is generated in a sensing system during a first period of time. The mechanical response is indicative of a change from an initial value to a final value of a sensed physical property. A continuous electrical signal is generated in the sensing system during the first period of time in response to the change of the sensed physical property and the continuous electrical signal is indicative of the mechanical response. The continuous electrical signal is converted into a plurality of discrete digital values as a function of time and the final value of the change in the sensed physical property is indicated as a function of one or more of the plurality of discrete digital values before the first period of time has elapsed.

In yet another aspect, a physical computer-readable medium stores computer-executable instructions for determining the magnitude of a change in a physical property. A computer-executable instruction applies a first time-dependent relationship to an analog electrical signal outputted by an electrical sensing element for determining a mechanical step change inputted to the electrical sensing element. The first time-dependent relationship characterizes the response of the electrical sensing element to the mechanical step change and the mechanical step change is outputted by a mechanical sensing element. A computer-executable instruction also applies a second time-dependent relationship to the determined mechanical step change outputted by the mechanical sensing element for determining a physical step change inputted to the mechanical sensing element. The second time-dependent relationship characterizes the response of the mechanical sensing element to the physical step change. And a computer-executable instruction applies a third time-dependent relationship to the determined physical step change inputted to the mechanical sensing element for determining the magnitude of a change in a physical property of an object. The third time-dependent relationship characterizes a response of the object to the change in the physical property of the object. In this instance, the physical step change is indicative of the response generated by the object, the mechanical step change is indicative of the response generated by the mechanical sensing element, and the analog electrical signal is indicative of the response generated by the electrical sensing element.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
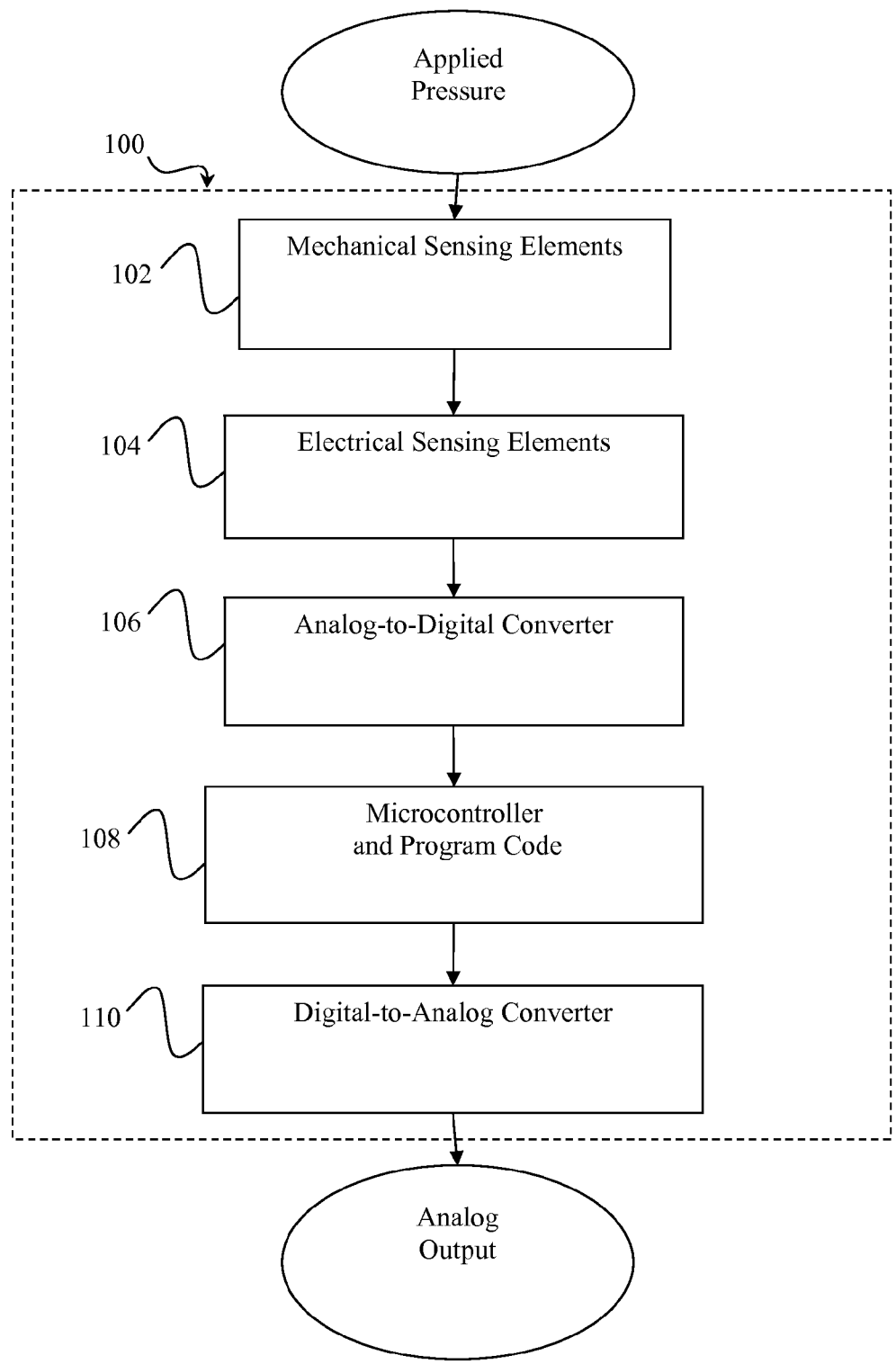
FIG. 1 illustrates components of an exemplary sensing system in accordance with an embodiment of the invention.

FIG. 1 illustrates the components of an exemplary sensing system 100 in accordance with an embodiment of the invention. The illustrated sensing system 100 is a pressure transmitter (e.g., differential pressure transmitter) but it should be noted that the sensing system 100 could be any other type of sensing system (e.g., temperature sensor, density meter, etc.) and the below teachings correspond to sensing the other types of physical properties (e.g., temperature, density, etc.). Exemplary pressure transmitters include the Invensys® Foxboro® family of pressure transmitters.

The sensing system 100 includes mechanical sensing elements 102, electrical sensing elements 104, analog-to-digital (A/D) converter 106, control circuit 108, and digital-to-analog (D/A) converter 110. The mechanical sensing elements 102 and electrical sensing elements 104 may be included within a single sensor. In one embodiment, the mechanical sensing elements 102 include a metal diaphragm and a fluid-filled chamber and the electrical sensing elements 104 include filtering elements. For further details about an embodiment of the mechanical sensing elements 102 and electrical sensing elements 104, see U.S. Pat. No. 6,279,401 by Karas, which is incorporated herein by reference. The control circuit may be comprised solely of a microcontroller and program code but it should be noted that alternative or additional circuitry may be used without departing from the scope of the invention.

In the sensing system 100, the mechanical sensing elements 102 are in communication with the electrical sensing elements 104. In an embodiment in which the mechanical sensing elements 102 include a metal diaphragm and a fluid-filled chamber, the metal diaphragm is operatively connected to the fluid-filled chamber. The electrical sensing elements 104 are electrically coupled to the A/D converter 106. In an embodiment in which the mechanical sensing elements 102 include a fluid-filled chamber, the electrical sensing elements 104 are connected to the fluid-filled chamber. In one embodiment, the A/D converter 106 is electrically coupled to the control circuit 108. In another embodiment, the A/D converter 106 is in communication with the control circuit 108. In an embodiment in which the control circuit 108 is part of a control circuit, the A/D converter 106 is connected to the control circuit. The control circuit 108 is connected to the D/A converter 110.

In operation, the mechanical sensing elements 102 generate a response in reaction to a pressure step, and the electrical sensing elements 104 generate an analog electrical signal that is indicative of the response generated by the mechanical sensing elements 102. In an embodiment in which the mechanical sensing elements 102 and the electrical sensing elements 104 are included within a single sensor, the sensor generates an analog electrical signal over a period of time in response to a pressure step. In an embodiment in which the mechanical sensing elements 102 include a metal diaphragm and a fluid-filled chamber, the metal diaphragm flexes away from a resting point in response to applied pressure, transferring pressure to the fluid-filled chamber and causing the electrical sensing elements 104 to generate an analog electrical signal that is proportional to the applied pressure.

The A/D converter 106 then receives the analog electrical signal generated by the electrical sensing elements 104 and converts it to a digital value. In operation, A/D converter 106 converts the analog electrical signal that is generated by electrical sensing elements 104 over a period of time into discrete digital values as a function of time. In one embodiment, the A/D converter 106 samples the analog electrical signal generated by the sensor that includes mechanical sensing elements 102 and electrical sensing elements 104 and converts each sample into a digital value.

The control circuit 108 receives the digital values from the A/D converter 106. In an embodiment in which the control circuit 108 is part of a control circuit, the control circuit receives the digital values from the A/D converter 106. The control circuit 108 is configured to apply one or more algorithms to the received digital values to produce a digital measurement value that represents the applied pressure. The D/A converter 110 then receives the digital measurement values from the control circuit 108 and converts them to an analog output signal that represents the applied pressure.

Figure 2:
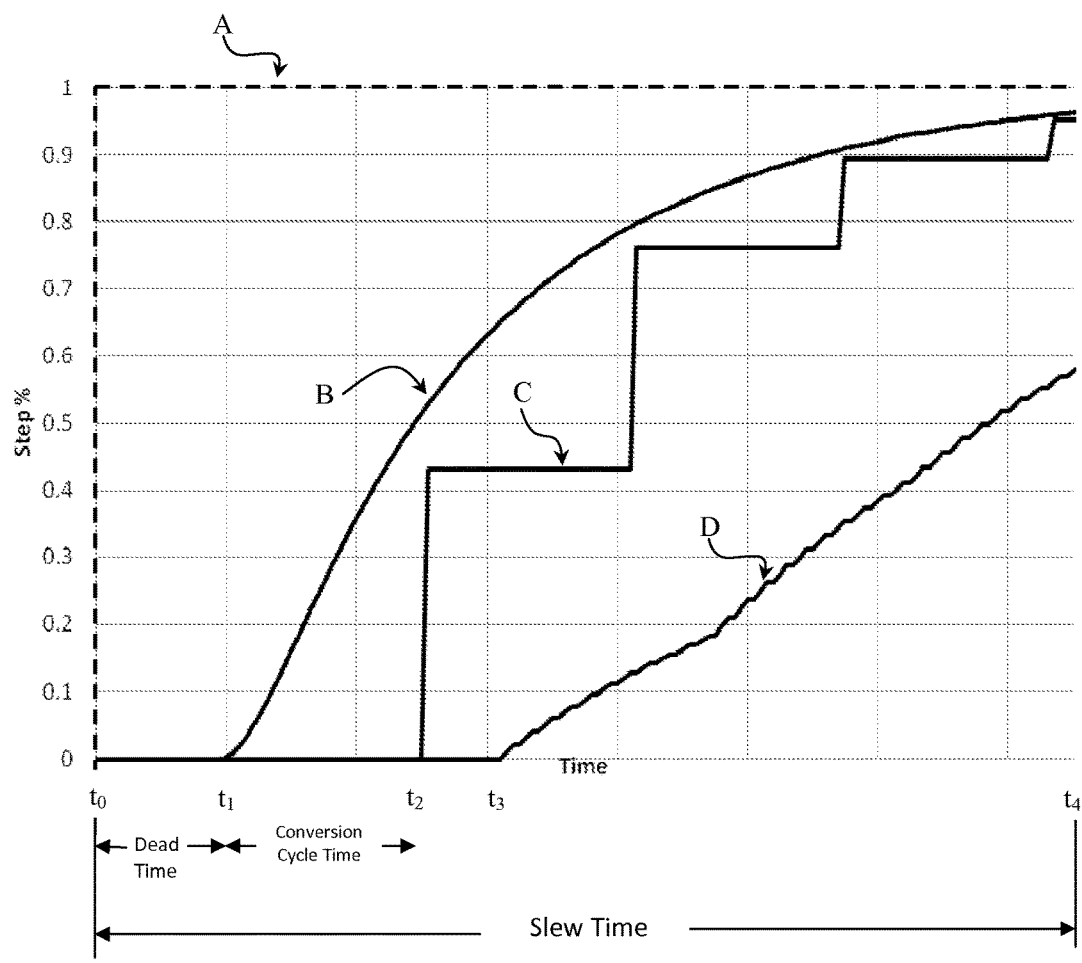
FIG. 2 is an exemplary graph illustrating various signals that represent various delays that occur within the sensing system of FIG. 1.

In general, there is a delay between the time at which a step occurs in the applied pressure and the time at which the step is represented in the analog output signal from the D/A converter 110. FIG. 2 is a graph illustrating various signals that exemplify various delays that occur within the sensor system 100. In the illustrated embodiment, Signal A represents the applied pressure and illustrates a pressure step that occurs at a first time, $t_0$. Signal B represents the analog electrical signal that is generated by the electrical sensing elements 104. Signal C represents the digital values generated by the A/D converter 106. Signal D represents the analog output signal that is produced by the D/A converter 110.

The amount of time that is required for the entire process input step (e.g., pressure step) to be represented by the analog electrical signal generated by the electrical sensing elements 104 (i.e., Signal B) that is provided to the A/D converter 106 is referred to as the slew time. The slew time is represented by the period of time between $t_0$ and $t_4$ in FIG. 2. The slew time may be due to, for example, time needed for fluid within the fluid-filled chamber to move such that the pressure change is communicated to the electrical sensing elements 104. Other factors that may contribute to the slew time include the time required for calculations by the control circuit 108 and time required for the D/A converter 110 to respond to a change in the signal produced by the control circuit 108.

The amount of time of the delay between the occurrence of the pressure step (i.e., Signal A) and any indication of a pressure change in the analog electrical signal (i.e., Signal B) provided to the A/D converter 106 is referred to as dead time. The dead time is represented by the period of time between $t_0$ and $t_1$ in FIG. 2. The dead time may be caused by, for example, the time needed for the mechanical sensing elements 102 to communicate with electrical sensing elements 104. Another exemplary cause of dead time is the time needed for propagation through additional electrical components that may exist to intentionally slow the signal's transitions to reduce noise that would otherwise be seen when the sensor is sampled under stable process conditions.

The amount of time of the delay between the arrival at the A/D converter 106 of the analog electrical signal generated by the electrical sensing elements 104 (i.e., Signal B) and the detection of that signal by the control circuit 108 (i.e., Signal C) is referred to as the conversion cycle time. The conversion cycle time is represented by the period of time between $t_1$ and $t_2$ in FIG. 2. The conversion cycle time may be caused by, for example, timing constraints associated with the control circuit 108. Another exemplary cause of conversion cycle time is that the A/D converter 106 may be used to read multiple inputs in sequence and the A/D converter 106 may be processing another input when the present input appears. In this instance, the A/D converter 106 must complete the processing of that input and potentially other inputs before the cycle returns to the point where the present input is examined.

Aspects of the present invention provide a reduction in the impact of the slew time for optimizing the step response time of the sensor system 100. Aspects of the present invention also reduce the need to make other changes to a sensing system that have less desirable consequences, such as increased noise or susceptibility to vibration effects. In particular, a model is developed to indicate how the analog electrical signal (i.e., Signal B) that is received at the A/D converter 106 slews when various process steps (i.e., pressure steps) occur. Based on this information, the control circuit 108 is configured to infer a final value of the pressure step before the control circuit 108 has received digital values from the A/D converter 106 that are proportional to the final value of the pressure step. In particular, digital values initially provided from the A/D converter 106 to the control circuit 108 in response to a pressure step (e.g., initial sequence of sensor readings) are used by the control circuit 108 to determine the final value of the pressure step.

In one embodiment, a model sensor system includes a set of reference sensors and electronic components. The model sensor system collects data as the reference sensors experience steps of different magnitudes and polarities (e.g., low-to-high pressure, high-to-low pressure) under varying ambient conditions. The collected data is used to develop a model characterizing how the analog electrical signal (i.e., Signal B in FIG. 2) provided to the A/D converter 106 slews when particular process steps (e.g., pressure steps) occur. In one embodiment further discussed below, the collected data may be modeled using a resistor-capacitor (RC) curve. Alternatively, the collected data may be modeled using other known techniques such as neural networking. In addition to the collected data noted above, the model may consider other parameters such as initial conditions, including the initial pressure and/or the sensor temperature.

In one embodiment, the control circuit 108 is configured to monitor the digital values to detect a process step. For example, the control circuit 108 is configured to detect a process step when a threshold change in magnitude of the sensor readings (e.g., digital values) occurs in a pre-defined time span. In response to detecting a process step, the control circuit 108 is configured to collect two or more digital values from the A/D converter 106 and to determine the change in magnitude of the digital values over a defined amount of time. The control circuit 108 then applies the determined change in magnitude and duration of time to the model to generate the magnitude of the process input step that occurred.

In one embodiment, the model sensor system is operated to examine three stages: (1) external environment response to a pressure step; (2) mechanical sensing elements response to a pressure step; (3) analog electrical signal response to filtering components that are included in the electrical sensing elements. Each stage is modeled mathematically using an RC equation shown below to model how each stage's output (O) will vary as a function of time (t) in response to a step (S).

$$O(t) = S * (1 - e^{-\left(\frac{t}{RC}\right)})$$

An RC value for each stage of the model sensor system is empirically determined to generate a model that is used by the sensor system (e.g., control circuit 108) for a particular change in magnitude of the digital values. Alternatively, each stage may be modeled using other known techniques, such as neural network algorithms or more sophisticated time-dependent models.

Continuing with the above embodiment, the analog electrical signal received at the A/D converter 106 represents the output value for the third stage. Once this third stage output value is determined, the RC value for the third stage (e.g., the RC value for electrical sensing elements 104), may be used to determine the input into the third stage, which is also the output of the second stage. The output of the second stage is used with the RC value for the second stage (e.g., the RC value for mechanical sensing elements 102) to determine the input to the second stage, which is also the output for the first stage. Similarly, the output from the first stage is used with the RC value for the first stage to determine the magnitude of the process step that must have occurred for the sensor to generate the sequence of values having the particular change in magnitude. Thus, the control circuit 108 is able to use the equations and the empirically determined RC values to determine the applied pressure value.

Accordingly, aspects of the present invention allow a sequence of sensor readings to be collected relatively early in the time period required for the sensor to respond to a process step, and use those sensor readings to determine the final value of the process step. As such, the magnitude of the process step can be provided at a time prior to the sensor fully reacting to the change in pressure. Thus, aspects of the present invention minimize delays due to signal slew time and eliminate the need for alternative modifications to the sensor system 100, which would impose noise and susceptibility to vibration effects.

Although described in connection with an exemplary processing environment, including computer-executable instructions, embodiments of the aspects of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different, or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and processes without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

What is claimed is:

1. A sensor system comprising:
   a sensor for generating an analog electrical signal in response to a step change in a physical property, wherein the sensor comprises:
      at least one mechanical component configured to generate a mechanical response to the step change in the physical property at a first time; and
      at least one electrical component in communication with the at least one mechanical component for generating the analog electrical signal from a second time to a fifth time, wherein a voltage of the analog electrical signal is zero at the second time and slews until the voltage is indicative, at the fifth time, of the response to the step change generated by said at least one mechanical component, wherein the second time is after the first time, and wherein the amount of time between the first time and the second time comprises a dead time caused by the time needed for the mechanical component to communicate with the electrical component;
   an analog-to-digital (A/D) converter connected to the at least one electrical component for receiving and converting the analog electrical signal into a plurality of discrete digital values from a third time to the fifth time, wherein the discrete digital values before the fifth time are less than the voltage of the analog electrical signal at the fifth time, wherein the third time is after the second time, wherein the fifth time is after the third time, and wherein the amount of time between the second time and the third time comprises a conversion cycle time; and
   a control circuit connected to the A/D converter for receiving the discrete digital values before the fifth time, wherein the control circuit is configured to infer, before the fifth time, the voltage of the analog electrical signal at the fifth time by applying a change in magnitude of two or more of the received discrete digital values to a model characteristic in response to detecting the step change indicated by one or more of the received discrete digital values, wherein the model characteristic comprises a predetermined slew rate of the analog electrical signal representing the response of the sensor to the step change in the physical property, and wherein the amount of time between the first time and the fifth time comprises a slew time, said slew time including the dead time and the conversion cycle time.

2. The sensor system of claim 1, wherein the sensor is a pressure sensor and the physical property is applied pressure, and wherein the at least one mechanical component includes a metal diaphragm and a fluid-filled chamber.

3. The sensor system of claim 1, wherein the model characteristic comprises a resistor-capacitor (RC) model to infer the voltage of the analog electrical signal at the fifth time before the fifth time has elapsed as a function of the model characteristic.

4. The sensor system of claim 1, wherein the model characteristic comprises a neural network to infer the voltage of the analog electrical signal at the fifth time before the fifth time has elapsed as a function of the model characteristic.

5. The sensor system of claim 1, wherein the control circuit is further configured to monitor a magnitude difference between the received discrete digital values and to detect the step change when the magnitude difference exceeds a threshold value within a predefined amount of time.

6. The sensor system of claim 1, wherein the control circuit provides a digital output signal as a function of the received discrete digital values, and the sensor system further comprises a digital-to-analog (D/A) converter connected to the control circuit for converting the digital output signal to an analog output signal beginning at a fourth time, wherein the analog output signal slews until it represents the step change in the physical property at the fifth time, wherein the fourth time is after the third time and before the fifth time.

7. A method comprising:
   generating a mechanical response by a mechanical component in a sensing system at a first time, wherein the mechanical response is indicative of a change from an initial value to a final value of a sensed physical property;
   generating a continuous electrical signal by an electrical component in the sensing system from a second time to a fifth time in response to the change of the sensed physical property, wherein a voltage of the continuous electrical signal is indicative of the initial value at the second time and slews until the voltage is indicative, at the fifth time, of the final value of the sensed physical property, wherein the second time is after the first time, and wherein the amount of time between the first time and the second time comprises a dead time caused by the time needed for the mechanical component to communicate with the electrical component;
   converting the continuous electrical signal into a plurality of discrete digital values from a third time to the fifth time, wherein the discrete digital values before the fifth time are less than the voltage of the continuous electrical signal at the fifth time, wherein the third time is after the second time, wherein the fifth time is after the third time, and wherein the amount of time between the second time and the third time comprises a conversion cycle time; and
   in response to detecting the mechanical response indicated by one or more of the discrete digital values, indicating, before the fifth time, the final value of the voltage of the continuous electrical signal at the fifth time by applying a change in magnitude of two or more of the received discrete digital values to a model characteristic, wherein the model characteristic comprises a predetermined slew rate of the continuous electrical signal corresponding to the mechanical response, and wherein the amount of time between the first time and the fifth time comprises a slew time, said slew time including the dead time and the conversion cycle time.

8. The method of claim 7, wherein the sensing system is a pressure sensor and the sensed physical property is applied pressure, and wherein the at least one mechanical component includes a metal diaphragm and a fluid-filled chamber.

9. The method of claim 7, wherein said indicating comprises applying a resistor-capacitor (RC) model to the plurality of discrete digital values and one or more initial conditions to indicate the final value of the voltage of the continuous electrical signal at the fifth time, before the fifth time has elapsed, as a function of the model characteristic.

10. The method of claim 7, wherein said indicating comprises applying a neural network model to the plurality of discrete digital values and one or more initial conditions to indicate the final value of the voltage of the continuous electrical signal at the fifth time, before the fifth time has elapsed, as a function of the model characteristic.

11. The method of claim 7, further comprising monitoring a magnitude difference between two or more of the plurality of discrete digital values and detecting a step change in the sensed physical property when the magnitude difference exceeds a threshold value within a second period of time, wherein the second period of time is a predefined subset between the first time and the fifth time.

12. The method of claim 7, further comprising providing a digital output signal as a function of the plurality of discrete digital values, and converting the digital output signal to a continuous output signal beginning at a fourth time, wherein the analog output signal clews until it represents the step change in the physical property at the fifth time, wherein the fourth time is after the third time and before the fifth time.

13. A physical computer-readable medium storing computer-executable instructions for:
   receiving, from an analog-to-digital converter, discrete digital values representing one or more samples of an analog electrical signal indicative of a mechanical response generated by a mechanical component at a first time in response to a step change in a physical property thereof, the analog electrical signal being generated from a second time to a fifth time and the discrete digital values being generated from a third time to the fifth time, wherein a voltage of the analog electrical signal is zero at the second time and slews until the voltage is indicative, at the fifth time, of the mechanical response generated by the mechanical component, wherein the second time is after the first time, wherein the amount of time between the first time and the second time comprises a dead time caused by the time needed for the mechanical component to communicate with the electrical component, wherein the discrete digital values before the fifth time are less than the voltage of the analog electrical signal at the fifth time, wherein the third time is after the second time, wherein the fifth time is after the third time, and wherein the amount of time between the second time and the third time comprises a conversion cycle time;
   detecting the step change in the physical property represented by the discrete digital values;
   inferring, before the fifth time, the voltage of the analog electrical signal at the fifth time as a function of a model characteristic, wherein the model characteristic comprises a predetermined slew rate of the analog electrical signal corresponding to the mechanical response generated by the mechanical component in response to said detecting, and wherein the amount of time between the first time and the fifth time comprises a slew time, said slew time including the dead time and the conversion cycle time; and
   providing a digital output signal representative of the inferred voltage of the analog electrical signal at the fifth time before the fifth time has elapsed.

14. The physical computer-readable medium of claim 13, wherein the model characteristic comprises a resistor-capacitor (RC) model to infer the voltage of the analog electrical signal at the fifth time before the fifth time has elapsed as a function of the model characteristic.

15. The physical computer-readable medium of claim 13, wherein said detecting comprises monitoring a magnitude difference between the received discrete digital values relative to a threshold value within a predefined amount of time, wherein the magnitude difference exceeding the threshold indicates the step change.

16. The physical computer-readable medium of claim 13, wherein the model characteristic comprises a model representing one or more other mechanical responses generated by the mechanical component in response to other step changes in the physical property thereof.

17. The physical computer-readable medium of claim 13, wherein the physical property is applied pressure and the mechanical component includes a metal diaphragm and a fluid-filled chamber.

18. The sensor system of claim 3, wherein the RC model infers the voltage of the analog electrical signal as a function of time in response to the step change in the physical property by an equation $$O(t) = S*\left(1 - e^{-\left(\frac{t}{RC}\right)}\right)$$

wherein O is an output, S is a step, and R and C are resistance and capacitance of a stage of the RC model.

19. The method of claim 9, wherein the RC model indicates the final value of the voltage of the continuous electrical signal as a function of time in response to the mechanical response by an equation $$O(t) = S*\left(1 - e^{-\left(\frac{t}{RC}\right)}\right)$$

wherein O is an output, S is a step, and R and C are resistance and capacitance of a stage of the RC model.

20. The physical computer-readable medium of claim 14, wherein the RC model infers the voltage of the analog electrical signal as a function of time in response to the mechanical response by an equation $$O(t) = S*\left(1 - e^{-\left(\frac{t}{RC}\right)}\right)$$

wherein O is an output, S is a step, and R and C are resistance and capacitance of a stage of the RC model.

* * * * *